United States Patent [19]

Johnson

[11] 4,011,681

[45] Mar. 15, 1977

[54] FISHING LURE

[76] Inventor: Manuel D. Johnson, 3284 Gwengreen, Bridgeton, Mo. 63044

[22] Filed: Oct. 28, 1975

[21] Appl. No.: 626,351

[52] U.S. Cl. .............................................. 43/42.11
[51] Int. Cl.² ....................................... A01K 85/00
[58] Field of Search ..................... 43/42.11, 42.13

[56] References Cited

UNITED STATES PATENTS

| 1,547,619 | 7/1925 | Shannon | 43/42.13 X |
| 2,281,578 | 5/1942 | Heddon | 43/42.13 |
| 3,143,824 | 8/1964 | Thomas | 43/42.11 |
| 3,500,573 | 3/1970 | Hudson | 43/42.11 |
| 3,546,804 | 12/1970 | Woolums | 43/42.11 |

Primary Examiner—Hugh R. Chamblee
Assistant Examiner—Daniel J. Leach
Attorney, Agent, or Firm—Polster and Polster

[57] ABSTRACT

A "spinner bait" fishing lure includes a harness having a forward apex portion defining a line or leader attachment point, a lower arm terminating in a fish hook, and an upper arm to which a spinner blade is attached. A coil spring formed in the upper arm provides improved action of the spinner blade and of the lure.

12 Claims, 5 Drawing Figures

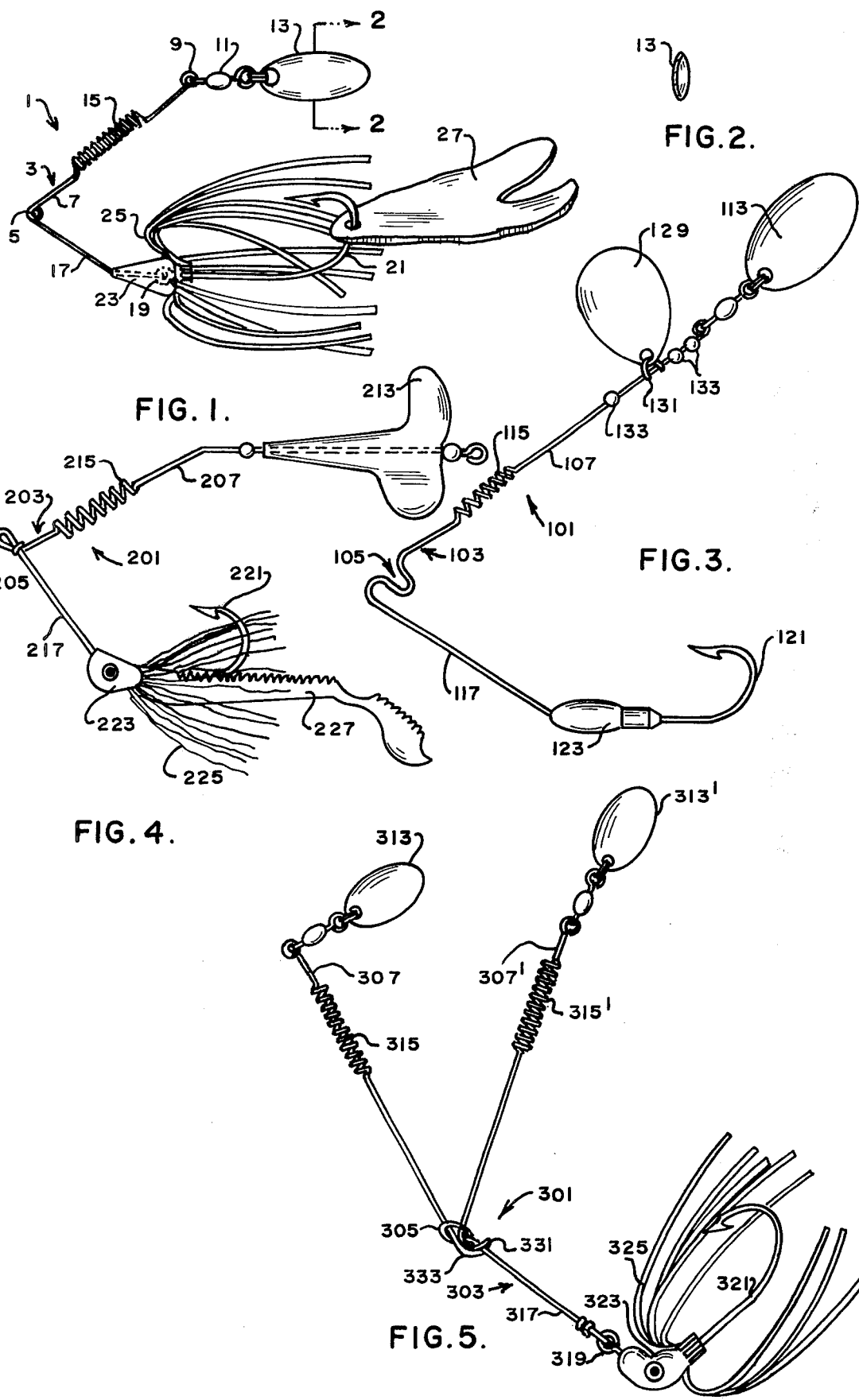

FISHING LURE

BACKGROUND OF THE INVENTION

This invention relates to fishing lures, and in particular to a type of fishing lure known as a spinner bait, overhead spinner bait, hairpin spinner bait, or safety pin spinner bait. This type of lure includes a wire harness having a forward apex portion to which the line or leader is attached, a lower arm extending downwardly and rearwardly from the apex portion, and an upper arm extending upwardly and rearwardly from the apex portion. The lower arm terminates in a fish hook. The upper arm carries one or more rotatable spinner blades.

Numerous styles of spinner baits are known.

In some spinner baits, the apex of the harness is a single hairpin bend; in others it is a double hairpin bend; in still others, it is an eye formed by a complete safety pin turn or a twist. The angle between the upper and lower arms may vary, from about 60° or less to about 130° or more, and the absolute and relative lengths of the arms may also vary. The arms are usually straight but are sometimes bent. The harness may be made of wire ranging typically from about 0.02 inch to about 0.04 inch in diameter.

Generally, the fish hook is a separate piece having a shank and eye, the lower arm of the harness extends through the eye to form a joint, and a weight or "lure body" is molded around the joint. However, the lure body is sometimes formed on the shank of the hook, and the connection between the lower harness arm and the shank is left exposed. Generally, the body is provided with a plastic or rubber type skirt to add a more life-like action to the lure. Trailers such as port rind strips are often added to the hook, and additional hooks may also be added.

The rotatable blade carried by the upper arm of the harness is generally a shallowly dished oval plate attached to the free end of the upper arm by a swivel. In so-called "tandem" spinner baits, a second blade is mounted on the upper arm. The oval spinner blade or blades may be of various sizes and shapes, as for example those known in the art as "Indiana," "Colorado," "Pear" or "Willow Leaf" blades. Still other spinner baits, used particularly for "buzzing" near the surface of the water, have a propeller-type blade on the upper arm in place of the oval blade or along with it. Yet another type of spinner bait, known as a "twin spin," has two upper arms, each of which carries a blade.

A spinner bait is generally regarded as achieving its effectiveness by a combination of flashing of the blade or blades and vibrations produced in the water as the bait is pulled through the water in what is known as a flutter action. Although spinner baits are widely regarded as among the most effective of baits, especially for bass fishing, ways are constantly being sought to increase their effectiveness.

SUMMARY OF THE INVENTION

One of the objects of this invention is to provide a spinner bait having greatly increased flutter and flashing action, and therefore having greater attractiveness to fish, such as bass and other game fish.

Another object is to provide such a spinner bait which moves with an erratic, pulsating action.

Another object is to provide such a spinner bait in which the means providing the improved action is not interposed between the fishing line and the hook portion of the lure.

Other objects will become apparent in light of the following description and accompanying drawings.

In accordance with this invention, generally stated, a spinner bait is provided, including a wire harness having a forward apex portion to which the line or leader is attached, a lower arm extending downwardly and rearwardly from the apex portion and terminating in a fish hook, and an upper arm extending upwardly and rearwardly from the apex portion and carrying at least one rotatable blade, in which the upper arm includes a multiple bend spring part spaced from the apex. The spring part is preferably a coil (helical) spring formed as a part of the wire harness and having from three to twenty turns. The new spinner bait produces greatly improved flutter and flashing action, and adds a pulsating action. When a trailer, such as a pork rind, is added to the hook, the action of the bait produces a realistic swimming motion in the trailer.

The invention is not limited to a particular style of spinner bait, nor is it limited to a particular depth or style of fishing. The wire gauge, number of coil turns, and even the type of spring, may be varied to suit a particular style of lure and type of lure action desired.

BRIEF DESCRIPTION OF THE DRAWINGS

FIG. 1 is a view in side elevation of one illustrative embodiment of fishing lure of this invention;

FIG. 2 is a sectional view taken along the line 2—2 of FIG. 1;

FIG. 3 is a view in side elevation of another embodiment of fishing lure of this invention;

FIG. 4 is a view in side elevation of another embodiment of fishing lure of this invention; and FIG. 5 is a view in perspective of another embodiment of fishing lure of this invention.

DESCRIPTION OF THE PREFERRED EMBODIMENT

Referring now to the drawings, and in particular to FIGS. 1 and 2, reference numeral 1 indicates one embodiment of improved spinner bait of this invention. The spinner bait 1 includes a harness part 3 formed of a resilient metal wire, such as 0.029 inch (0.74 mm) diameter resilient steel wire, of a type known as piano wire. The harness 3 includes an apex portion 5 formed as a single-turn safety-pin eye. The upper arm 7 of the harness terminates in an eye 9 to which is attached a standard swivel 11 carrying a standard spinner blade 13. As shown in FIG. 2, the blade 13 is shallowly dished in the conventional manner. The central portion of the upper arm 7 is bent to form a helical spring 15. The spring 15 includes eleven turns of wire, has a length of 0.75 inch (19 mm), and an exterior diameter of 0.13 inch (3.3 mm). The spring 15 is spaced 0.5 inch (12.7 mm) from the apex portion 5, and 0.5 inch (12.7 mm) from the eye 9 at the distal end of the upper arm 7.

The lower arm 17 of the spinner bait 1 extends downwardly at an angle of about 60° from the upper arm 7. The distal end of the lower arm 17 extends through an eye 19 of a fish hook 21 and is twisted to secure it to the hook. A lead body 23 is molded around the joint in a conventional manner. A skirt 25 is secured to the lead body 23, also in a conventional manner. A trailer 27, which may also be conventional, is slipped onto the hook 21.

When the improved spinner bait 1 is used, a fishing line or leader is tied to the apex eye 5 in a conventional manner. The bait is cast in a conventional manner and is retrieved in what is known as a flutter action. As the bait is being reeled in with the rod tip pointed down, the rod tip is raised to a 10 o'clock position, and then is dropped back down. The upswing of the rod tip causes the bait to move up in the water, and the downswing of the rod tip causes the bait to flutter downward as if it is faltering. The erratic movement of the bait causes the spinner blade 13 to flutter and flash, as with a conventional spinner bait. However, the spring 15 allows far more side-to-side and up-and-down movement of the blade 13 relative to the hook 21 than with ordinary spinner baits. Perhaps more importantly, the movement of the bait and the drag of the blade 13 cause the spring 15 to alternately expand and contract. The expansion and contraction of the spring 15 gives the entire lure an erratic, pulsating motion. The pulsating motion is in itself attractive to fish, and further gives a natural undulating swimming motion to the trailer 27. The spring 15 also makes the bait more effective, by increasing its flutter, flash and pulsating movement when the bait is pulled through the water in a straight retrieve, or, for that matter, in any other type of retrieve favored by a particular fisherman.

The advantages of the present invention may also be realized with other styles of spinner bait, as shown in FIGS. 3–5. In the description of these embodiments, numbers corresponding to the numbers used in describing the first embodiment are used to designate corresponding parts.

In FIG. 3, a tandem spinner bait 101 includes a harness 103 made of 0.035 inch (0.9 mm) diameter stainless steel wire. The apex 105 of the harness 103 is a conventional double hairpin bend. The line is tied to the lower bend of the apex. The upper arm 107 carries at its distal end a dished spinner blade 113 rotatably mounted to the arm 107. A second blade 129 is also mounted on the upper arm 107 by means of a rotatable stirrup 131. Spacer beads 133 position the stirrup 131 on the upper arm 107. This arrangement is conventional in a tandem spinner bait. A helical spring 115 is formed in the upper arm 107 includes seven turns of wire, has a length of 0.8 inch (20 mm), and an outside diameter of 0.15 inch (3.8 mm). The spring is spaced 0.63 inch (16 mm) from the apex 105 and two inches (50 mm) from the distal end of the arm 107. The lower arm 117 of the spinner bait 101 is secured to a fish hook 121, and a lead weight 123 is molded around the joint between the arm 117 and hook 121. The spinner bait 101 includes neither a brush skirt nor a trailer. The spring 115 of this embodiment is considerably stiffer than the spring 15 of the previous embodiment. The stiffer spring 115 gives a less vigorous and more controlled action to the spinner bait 101 than the action of the first embodiment 1. The greater action and drag of the tandem spinners 113 and 129, however, compensate to a large degree for the greater spring stiffness.

In FIG. 4, an improved spinner bait 201 includes a propeller-type blade 213 rotatably mounted on an upper arm 207 or a wire harness 203. The harness 203 is made of 0.04 inch (1.0 mm) stainless steel wire twisted to form an apex eye 205. The upper arm 207 and lower arm 217 are bent to permit the propeller blade 213 to rotate on an axis parallel with the shank of the hook 221. The proximal ends of the arms 203 and 217 form an angle of 80° with each other. Spring 215 in the upper arm 207 includes seven turns of wire, and has a length of 0.8 inch (20 mm) and an exterior diameter of 0.2 inch (5 mm). The spring 215 is spaced 0.3 inch (7.5 mm) from the apex 205. The lower arm 217 is joined to the head of a hook 221 and the joint is covered by a lead weight 223. A skirt 225 and trailer worm 227 are mounted on the hook adjacent the weight 223. The improved lure 201 is designed for "buzzing" near the surface of the water. The stiffness of the spring 215 compensates for the greatly increased drag of the propeller 213 and acts primarily to impart a pulsating movement to the lure 201.

An improved twin spin bait 301, shown in FIG. 5, includes a wire harness 303 made in two parts. The lower arm 317 is made of 0.04 inch (1 mm) diameter steel wire. The upper end of the lower arm 317 forms an eye 305. A pair of upper arms 307 and 307' are formed from a single wire 331 having a diameter of 0.02 inch (0.5 mm). The wire forming the upper arms 307 and 307' is re-entrantly bent at its central portion as shown at 331. The lower end of the arm 307 extends downwardly through the eye 305, circles around the upper side of the arm 317 and extends back upwardly through the eye 305 as arm 307'. This arrangement permits the arms 307 and 307' to squeeze together and slide down a distance onto the lower arm 317 for compact storage of the lure 301. This construction is conventional in twin spin lures. The fishing line or leader is tied to the eye 305. The arms 307 and 307' carry dished spinner blades 313 and 313' on swivels at their distal ends. Springs 315 and 315' are formed in the arms 307 and 307', respectively. It will be seen that the springs 315 and 315' must be formed in the arms, and the blades 213 and 213' attached to the arms 307 and 307', after the wire 331 is run through the eye 305. Each spring 315 and 315' includes eleven turns of wire, is 0.75 inch (19 mm) long, and is 0.1 inch (0.25 mm) in exterior diameter. The springs are spaced 1.5 inch (38 mm) from the apex 305, and 0.5 inch from the distal end of the arms 307 and 307'. When the arms 307 and 307' are in their fully extended position, they form an angle of 60° with each other, and the plane through them forms an angle of 100° with the lower arm 317. The lower end of the lower arm 317 of the spinner bait 301 is twisted onto an eye 319 of a jig-type hook 321. Lead weight 323 of this embodiment is formed around the 90° bend in the shank of the hook 321 and the joint between the lower arm 317 and the hook eye 319 is left exposed and free to pivot. A skirt 325 is provided on the body 323. This type of lure is particularly effective where the lure is cast and allowed to flutter to the bottom. The rather light springs 307 and 307' enhance the flutter action of the blades 313 and 313' and provide the lure with enough irregular movement to make it "interesting."

Numerous variations in the spinner bait of this invention, within the scope of the appended claims, will occur to those skilled in the art in view of the foregoing description. For example, the size and number of turns of the helical springs may be varied, as may the wire size and material, although it has been found that a highly resilient wire having a diameter in the range of 0.02 inch to 0.04 inch is particularly desirable, and that from about three to twenty turns of wire are needed. Although a helical spring is preferred, other springs which provide increased flexibility and resilient bending movement of the upper arm of the lure as well as resilient elongation or contraction of the arm may also be used. Numerous other styles of spinner baits may also be modified in accordance with the present invention. These variations are merely illustrative.

I claim:

1. A spinner bait comprising a wire harness having a forward apex portion to which a line or leader may be attached, a lower arm extending downwardly and rearwardly from the apex portion and terminating in a fish hook, and an upper arm extending upwardly and rearwardly from the apex portion and carrying at least one rotatable blade, characterized in that a substantial portion of said upper arm includes multiple bend spring means for resiliently increasing the flexibility of said upper arm and for resiliently changing the length of said upper arm to give the entire bait a pulsating motion as it is drawn through the water.

2. The spinner bait of claim 1 wherein said spring means comprise a helical spring formed from said wire harness.

3. The spinner bait of claim 2 wherein said spring has from three to twenty turns.

4. The spinner bait of claim 3 wherein said harness is made of a resilient metal wire having a diameter of from 0.02 inch to 0.04 inch.

5. The spinner bait of claim 4 wherein said blade is a dished oval plate held to said upper arm by a swivel.

6. The spinner bait of claim 2 wherein said apex portion is formed as a safety-pin bend.

7. The spinner bait of claim 2 wherein the apex portion is formed as a hairpin bend.

8. The spinner bait of claim 7 wherein the hairpin bend is a double hairpin bend.

9. The spinner bait of claim 2 wherein an elongate trailer is connected to said hook.

10. The spinner bait of claim 2 including a second upper arm of said harness, and being joined to said lower arm at said apex, said second arm also having formed in it a helical spring and also carrying a rotatable blade.

11. The spinner bait of claim 5 wherein said spring has from seven to eleven turns.

12. The spinner bait of claim 11 further including a second blade carried by said upper arm.

* * * * *